(12) United States Patent
Manzoni et al.

(10) Patent No.: US 11,346,719 B2
(45) Date of Patent: May 31, 2022

(54) FOURIER-TRANSFORM HYPERSPECTRAL IMAGING SYSTEM

(71) Applicants: POLITECNICO DI MILANO, Milan (IT); CONSIGLIO NAZIONALE DELLE RICERCHE, Rome (IT)

(72) Inventors: Cristian Angelo Manzoni, Bergamo (IT); Giulio Cerullo, Milan (IT); Dario Polli, Milan (IT); Antonio Perri, Milan (IT); Fabrizio Preda, Milan (IT); Gianluca Valentini, Milan (IT); Andrea Bassi, Milan (IT)

(73) Assignees: POLITECNICO DI MILANO, Milan (IT); CONSIGLIO NAZIONALE DELLE RICERCHE, Rome (IT)

( * ) Notice: Subject to any disclaimer, the term of this patent is extended or adjusted under 35 U.S.C. 154(b) by 0 days.

(21) Appl. No.: 17/269,432

(22) PCT Filed: Jul. 25, 2019

(86) PCT No.: PCT/IB2019/056368
§ 371 (c)(1),
(2) Date: Feb. 18, 2021

(87) PCT Pub. No.: WO2020/039283
PCT Pub. Date: Feb. 27, 2020

(65) Prior Publication Data
US 2021/0181022 A1    Jun. 17, 2021

(30) Foreign Application Priority Data

Aug. 23, 2018   (IT) .................... 102018000008171

(51) Int. Cl.
*G01J 3/28*     (2006.01)
*G01J 3/02*     (2006.01)
*G01J 3/453*    (2006.01)

(52) U.S. Cl.
CPC ........... *G01J 3/2823* (2013.01); *G01J 3/0208* (2013.01); *G01J 3/4537* (2013.01)

(58) Field of Classification Search
CPC ................... G01J 2003/2826; G01J 3/2823
See application file for complete search history.

(56) References Cited

U.S. PATENT DOCUMENTS

| 6,411,389 B1 * | 6/2002 | Rushford | ............. G01B 11/065 |
|---|---|---|---|
| | | | 356/492 |
| 2014/0185052 A1 | 7/2014 | Chen | |

FOREIGN PATENT DOCUMENTS

| WO | 2004005870 A1 | 1/2004 | |
|---|---|---|---|
| WO | WO-2018185583 A1 * | 10/2018 | ........... G02B 5/3083 |

OTHER PUBLICATIONS

Andrew Robert Harvey, "Birefringent Fourier-transform imaging spectrometer" Nov. 2004, Optics Express (Year: 2004).*
International Search Report dated Feb. 28, 2020; 5 pages.

* cited by examiner

*Primary Examiner* — Maurice C Smith
(74) *Attorney, Agent, or Firm* — Mark Malek; Widerman Malek, PL (57) ABSTRACT

A Fourier-transform hyperspectral imaging system may include an optical imaging system configured to produce an image of an object, and an adjustable birefringent common-path interferometer module comprising a movable birefringent element and configured to produce interfering replicas of an input radiation which are delayed from each other by a phase delay adjustable by the moving birefringent element. The interferometer module may be configured to produce collinear replicas for entering optical rays parallel to said optical axis. The hyperspectral imaging system further comprises a two-dimensional light detector configured to receive the replicas and provide digital images of the object depend- (Continued)

ing on said adjustable phase delay. The system also includes an analysis device configured to perform a Fourier Transform of the digital images to obtain a hyperspectral representation of the object.

12 Claims, 8 Drawing Sheets

FOURIER-TRANSFORM HYPERSPECTRAL IMAGING SYSTEM

RELATED APPLICATIONS

This application is a national phase application of and claims priority under 35 U.S.C. § 371 of PCT Application Serial No. PCT/IB2019/056368 filed on Jul. 25, 2019 and titled FOURIER-TRANSFORM HYPERSPECTRAL IMAGING SYSTEM, which claims the benefit of IT 102018000008171, filed on Aug. 23, 2018, each of which is hereby incorporated by reference in its entirety.

BACKGROUND

Technical Field

The present invention relates to a hyperspectral imaging system.

Description of the Related Art

It is known a method of measuring spectrally-resolved images by placing a bandpass filter between an object and a camera or by employing multichannel detectors, and acquiring one image for each spectral band. The number of detected bands and the spectral width of each band depends on the tuning capability of the spectral filter and of the detector. This technique, which collects spectral information in a discrete set of optical bands, is also referred-to as multispectral imaging.

Another approach is based on Fourier-transform spectroscopy and uses an interferometer between the object and the detector. Document J. Craven-Jones et al. "Infrared hyperspectral imaging polarimeter using birefringent prisms", Applied Optics, Vol. 50, n. 8, 10 Mar. 2011 describes a short-wavelength and middle-wavelength infrared hyperspectral imaging polarimeter (IHIP) including a pair of sapphire Wollaston prisms and several high-order retarders to form an imaging Fourier transform spectropolarimeter. The Wollaston prisms serve as a birefringent interferometer with reduced sensitivity to vibration versus an unequal path interferometer, such as a Michelson. Polarimetric data are acquired through the use of channeled spectropolarimetry to modulate the spectrum with the Stokes parameter information. The collected interferogram is Fourier filtered and reconstructed to recover the spatially and spectrally varying Stokes vector data across the image.

Moreover, document A. R. Harvey et al. "Birefringent Fourier-transform imaging spectrometer", OPTICS EXPRESS 5368 No. 22, Vol. 12, 1 Nov. 2004 discloses a Birefringent Fourier-transform imaging spectrometer based on an entrance polarizer, two cascaded Wollaston prisms (one fixed and the other movable) a second polarizer and an imaging lens.

The Applicant noticed that the technique described in the above-mentioned documents shows a limited interferometric modulation due to chromatic dispersion and spatial separation of the replicas of light in propagating through the Wollaston prisms.

SUMMARY OF THE INVENTION

The present invention provides for a Fourier-transform hyperspectral imaging system based on birefringence which is alternative to the known ones and less critically dependent on chromatic dispersion and spatial separation of the generated replicas with respect the prior art systems.

The present invention relates to a Fourier-transform hyperspectral imaging system as defined by the appended claim 1. Particular embodiments of the system are described by the dependent claims 2-12.

BRIEF DESCRIPTION OF THE DRAWINGS

Further characteristics and advantages will be more apparent from the following description of a preferred embodiment and of its alternatives given as an example with reference to the enclosed drawings in which.

DETAILED DESCRIPTION

Figure 1:
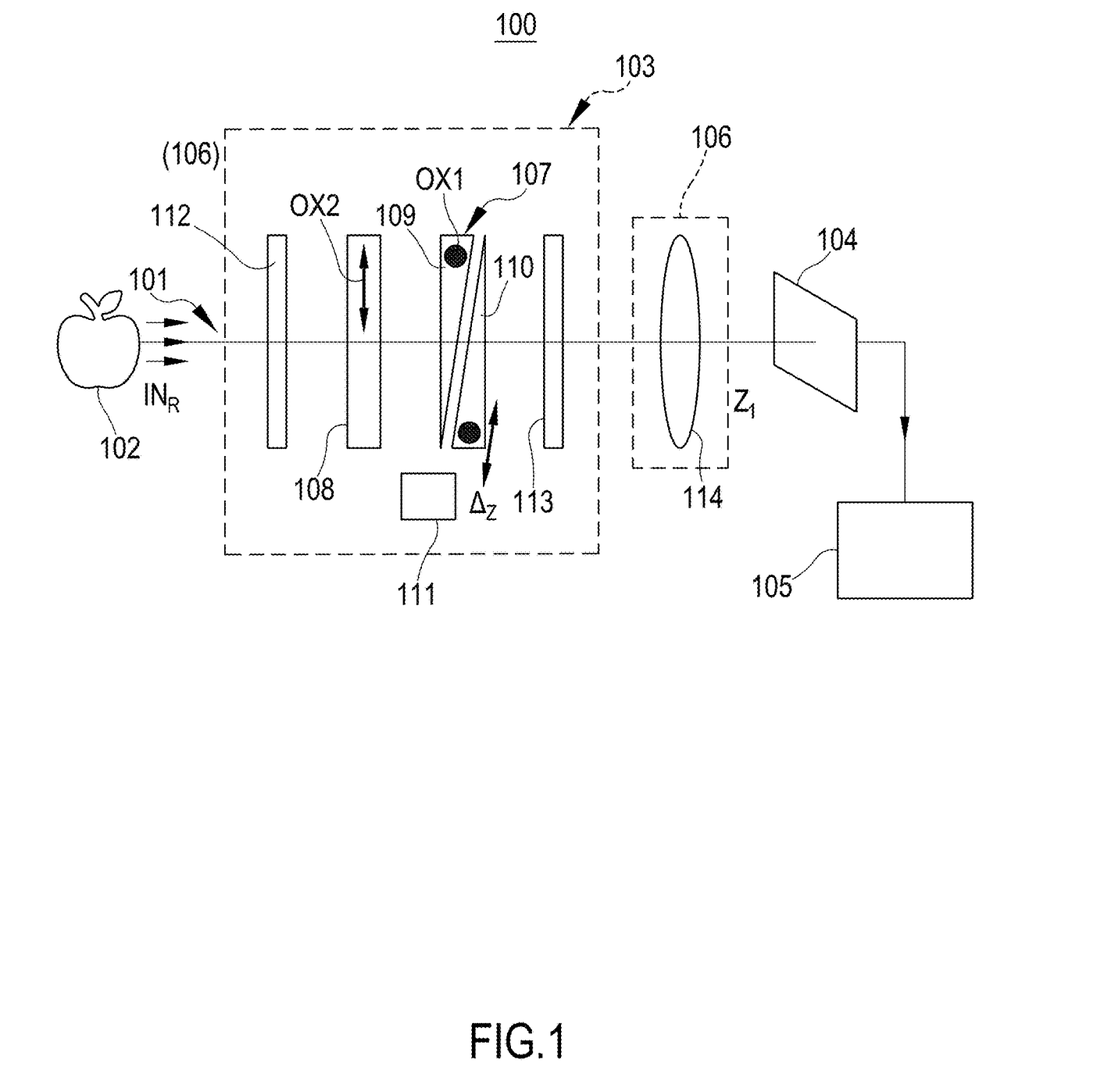
FIG. 1 shows an example of a first embodiment of a Fourier-transform hyperspectral imaging system.

FIG. 1 shows a first embodiment of a Fourier-transform hyperspectral imaging system 100 which can be used to measure the spectrum of the radiation field arising from reflection, transmission, fluorescence, phosphorescence, diffusion, emission, scattering (e.g. Raman), or any other optical process in which radiation (i.e. electromagnetic radiation; e.g. light) arises from one or more points of an object. As it will be clear from the following description the hyperspectral imaging system 100 can be used to obtain a hyperspectral camera, a hyperspectral microscope or to perform tunable filtering.

The Fourier Transform hyperspectral imaging system 100 (hereinafter "hyperspectral imaging system") comprises an optical imaging system 106, an adjustable birefringent common-path interferometer module 103 (hereinafter also called interferometer module), a two-dimensional light detector 104 and an analysis device 105.

The optical imaging system 106 is configured to produce an image of an object 102 and defines and optical axis $z_1$. As schematically represented in FIG. 1, an input radiation $IN_R$, comprising a bundle of rays, emerges from each point of the object 102.

The optical imaging system 106 comprises one or more optical components (such as an example, lenses or objectives) selected and designed according to the particular application to be implemented. The optical imaging system 106 is provided with an input 101 for the input radiation $IN_R$ coming from the object 102. According to the example of FIG. 1, the optical axis $z_1$ is parallel to a main propagation direction of the input radiation $IN_R$.

The input 101 can be an opening of a housing containing the components of the hyperspectral imaging system 100 and can be, as an example, provided by optical components (such as, a lens, an objective or a combination of them). In general, the input 101 can be a real or virtual aperture that constitutes the entrance window of the optical imaging system 106.

The adjustable birefringent common-path interferometer module 103 (hereinafter also called "interferometer module") is configured to produce replicas of the input radiation $IN_R$ which are delayed from each other by adjustable phase delays and adapted to interfere with each other. The interferometer module 103 comprises at least a movable birefringent element 110 and is configured to produce collinear replicas for entering optical rays parallel to the optical axis $z_1$ of the optical imaging system 106.

The two-dimensional light detector 104 (also called "2D detector") is optically coupled to the interferometer module 103 to receive said replicas. The 2D detector 104 is configured to provide a plurality of digital images of the object 102 depending on said adjustable delays.

Moreover, the hyperspectral imaging system 100 comprises an analysis device 105 connected to the light detector 104 and configured to translate the plurality of digital images into a frequency domain to obtain a hyperspectral representation of the object 102. The analysis device 105 is configured to compute a Fourier Transform of the digital signal corresponding to each point of the digital images provided by the light detector 104.

The embodiment shown in FIG. 1 refers, particularly, to a hyperspectral imaging system 100 operating as a hyperspectral camera.

It is observed that according to the embodiment of FIG. 1, the optical coupling system 106 includes an objective or a lens 114, placed at an input of the 2D detector 104.

The interferometer module 103 is provided, particularly, with an adjustable wedge pair 107 and an optical element 108. The adjustable wedge pair 107 is configured to provide an adjustable phase delay between radiation components passing through it and having reciprocally orthogonal polarizations.

The adjustable wedge pair 107 comprises a first optical wedge 109 and a second optical wedge 110. Both first 109 and second 110 optical wedges are made of a birefringent material. As an example, the first 109 and second 110 optical wedges have corresponding optical axes OX1 of the birefringence material parallel to each other. Particularly, the first optical wedge 109 and the second optical wedge 110 are optical prisms, having, preferably, the same apex angle. The first optical wedge 109 coupled to the second optical wedge 110 is equivalent to an optical plate having variable thickness.

At least one of the two optical wedges 109 and 110 is movable (e.g. it can be translated) along a direction transversal to the main direction $z_1$ by means of an actuator 111, schematically represented in FIG. 1. According to a specific example, the first optical wedge 109 is fixed and the second optical wedge 110 is movable.

The adjustable phase delay introduced by the wedge pair 107 is dependent on the variable position of the second optical wedge 110. Moreover, as an example, the actuator 111 may be connected to a computer-controlled precision translation stage. Alternatively, the analysis device 105 reads and suitably stores the position values assumed by the second optical wedge 110 shifted by the actuator 111.

It is noticed that the first 109 and the second optical wedges 110 can be arranged to be very close to each other in order to avoid/minimize chromatic dispersion and spatial separation of the replicas. As an example, the first optical wedge 109 and the second optical wedge 110 can be at a distance between the corresponding adjacent tilted faces of 0-1 mm.

Optical element 108 is a birefringent plate (e.g. with fixed thickness) having a respective optical axis OX2 of the birefringent material perpendicular to the optical axis OX1 of wedge pair 107 and the main direction $z_1$. Optical element 108 is coupled with the adjustable wedge pair 107 and configured to introduce a fixed phase delay between the radiations having reciprocally orthogonal polarizations.

Moreover, interferometer module 103 is equipped with an input polarizer 112 to provide an output radiation of linear polarization transversal to the optical axes OX1 and OX2 and, preferably, having tilt of 45° with respect to such axes. According to the shown example, the input polarizer 112 is placed between the object 102 and the optical element 108.

The interferometer module 103 also includes an output polarizer 113, as an example, interposed between the adjustable wedge pair 107 and the optical coupling system 106. As the skilled person can recognize, the order of the elements of the interferometer module 103 can be different from the one shown in the drawings. Optionally, some of the above described components may be glued together.

With reference to the operation of the system 100 of FIG. 1 it is observed that the radiation $IN_R$ from each point of the object 102 propagates through the interferometer module 103, the objective or lens 114 and is collected by the 2D detector 104. Particularly, for input beam polarization, set by the input polarizer 112, as an example at 45° with respect to the optical axes OX1 and OX2, the optical element 108 introduces a fixed phase delay between the two orthogonally polarized components of the light that propagate along the fast and slow axes of the birefringent material. These fast and slow axes are defined as the directions of polarization an electromagnetic wave should possess to maintain its linear polarization at the output of a birefringent plate and they differ by the fact that a wave polarized along the fast axis travels at a higher speed inside the material with respect to the one polarized along the slow axis.

The adjustable wedge pair 107 introduces a phase delay of opposite sign with respect to optical element 108. By moving the second optical wedge 110, in accordance with the example indicated in FIG. 1, or by moving both the optical wedges 109 and 110, it is possible to continuously change the optical path of the adjustable wedge pair 107, thus allowing changing the phase delay between the two orthogonally polarized components of the light.

The combination of the optical element 108 and the adjustable wedge pair 107 allows setting phase delays ranging from positive to negative values. The output polarizer 113 projects the two delayed replicas to a common polarization state, allowing them to interfere.

As indicated above, by scanning the position $\Delta z$ of one of the first wedge 109 and second wedge 110, it is possible to change continuously the phase delay between the two replicas; for each wedge position $\Delta z$, the imaging system acquires an image of the object $S(x,y,\Delta z)$, where $(x,y)$ are the spatial coordinates of the image points on the 2D detector 104.

Figure 3:
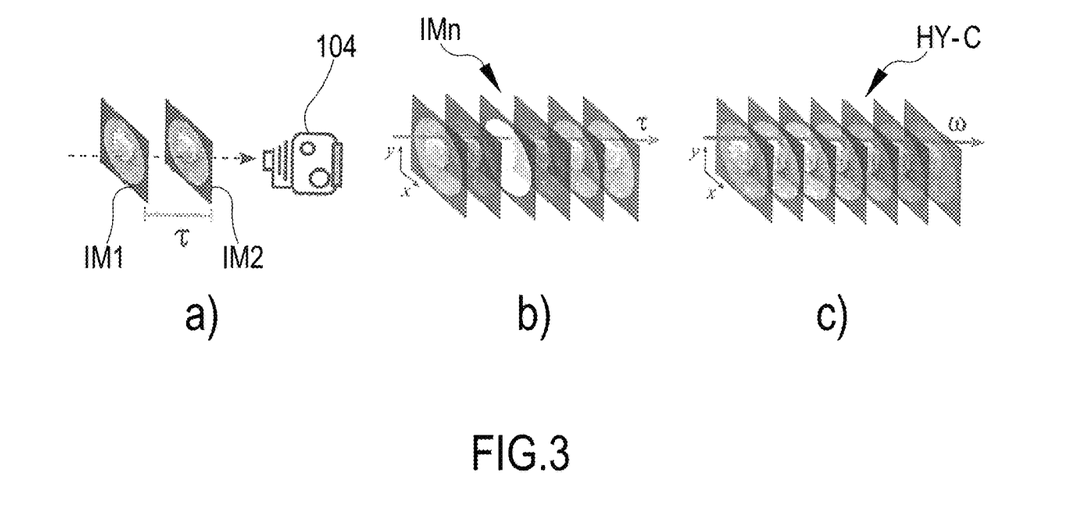
FIG. 3 schematically represents the operation of the system of FIG. 1.

FIG. 3a) shows, symbolically, two replica images IM1 and IM2 delayed by a time delay $\tau$ (corresponding to a phase delay) as detected by the 2D detector 104. The interference of the replicas is performed for different values of the wedge position $\Delta z$ and for each of the spatial coordinates of the image $(x,y)$ corresponding to a pixel of a 2D image.

A plurality of images IMn (FIG. 3b) for the different wedge positions are stacked together leading to the delay-dependent interference image $S(x,y,\Delta z)$. Particularly, a digital signal corresponding to the plurality of images IMn is stored into the analysis device 105.

The analysis device 105 translates the digital signal in the frequency domain through a Fourier Transform (FT) procedure, leading to:

$$S(x,y,\omega)=FT\{S(x,y,\Delta z)\}(x,y,\omega)=\int S(x,y,\Delta z)e^{(\omega\Delta z)}d(\Delta z) \qquad (1)$$

The function $S(x,y,\omega)$ is the so-called hypercube, and carries the spectrum of each point at coordinate $(x,y)$ of the image. FIG. 3c) sketches the $S(x,y,\omega)$ hypercube (HY-C).

Figure 2:
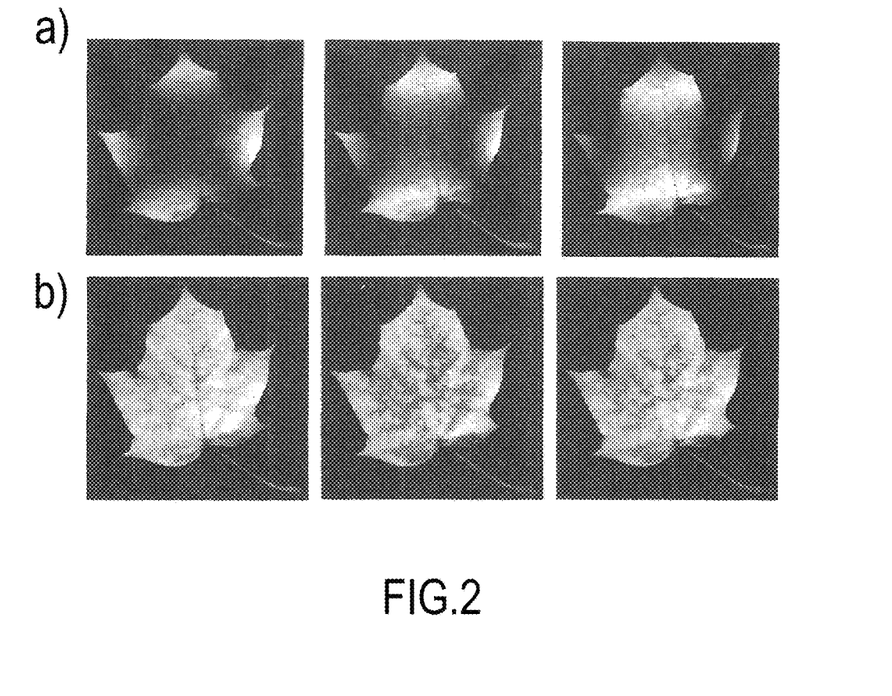
FIG. 2 exemplary shows images obtained by an experimental Fourier-transform hyperspectral imaging system made in accordance with the one of FIG. 1.

FIG. 2 refers to experimental results obtained with a system of the type above described. FIG. 2a) shows images as a function of position of $\Delta z$ the second optical wedge 110. FIG. 2b) shows images at different wavelengths (from left to right 595 nm, 640 nm and 685 nm) obtained by Fourier transforming the map of the images of FIG. 2a) along the wedge position axis $\Delta z$. It is observed that FIG. 2b) represents a projection of the hypercube $S(x,y,\omega)$ of one image at three specific frequencies (or, equivalently, wavelengths).

Figure 4:
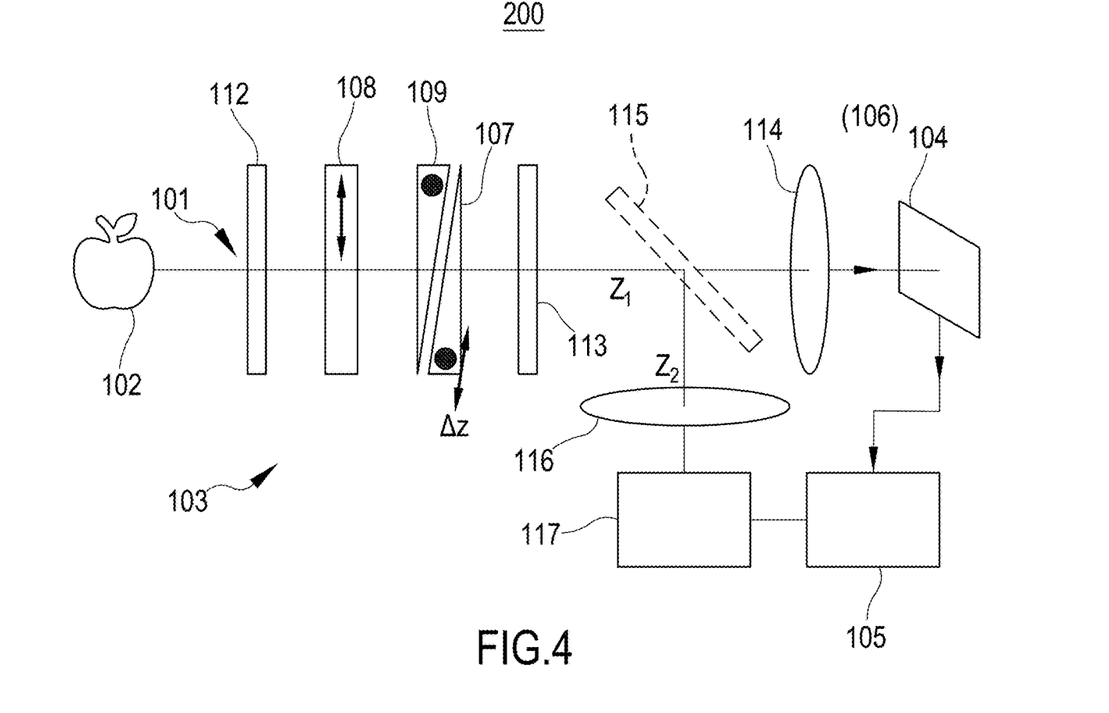
FIG. 4 shows an example of a second embodiment of the Fourier-transform hyperspectral imaging system, operating as a camera.

FIG. 4 shows a second embodiment, indicated with the reference number 200, of the Fourier-transform hyperspectral imaging system 100. The Fourier-transform hyperspectral imaging system 200 of FIG. 4 is analogous to the one of FIG. 1 but it further includes a beam splitter 115 placed, as an example, between the output polarizer 113 and the objective or lens 114.

The beam splitter 115 (e.g. dichroic) separates the entering radiation into a first portion that propagates along the main direction $z_1$ and a second portion that propagates along a secondary direction $z_2$.

Along the secondary direction $z_2$, an additional optical imaging system 116 (having optical axis $z_2$) followed by an additional two-dimensional light detector 117 are provided. The additional two-dimensional light detector 117 (connected to the analysis device 105) and the two-dimensional light detector 104 show sensitivity in different spectral regions. As an example, the additional two-dimensional light detector 117 may have proper sensitivity to operate in a spectral region different from the one of the two-dimensional light detector 104. Therefore, the additional optical imaging system 116 and the additional two-dimensional light detector 117 allow obtaining hyperspectral representations of the object 102 in a large spectral region which is the combination of the sensitivity ranges of detectors 117 and 104.

Figure 5:
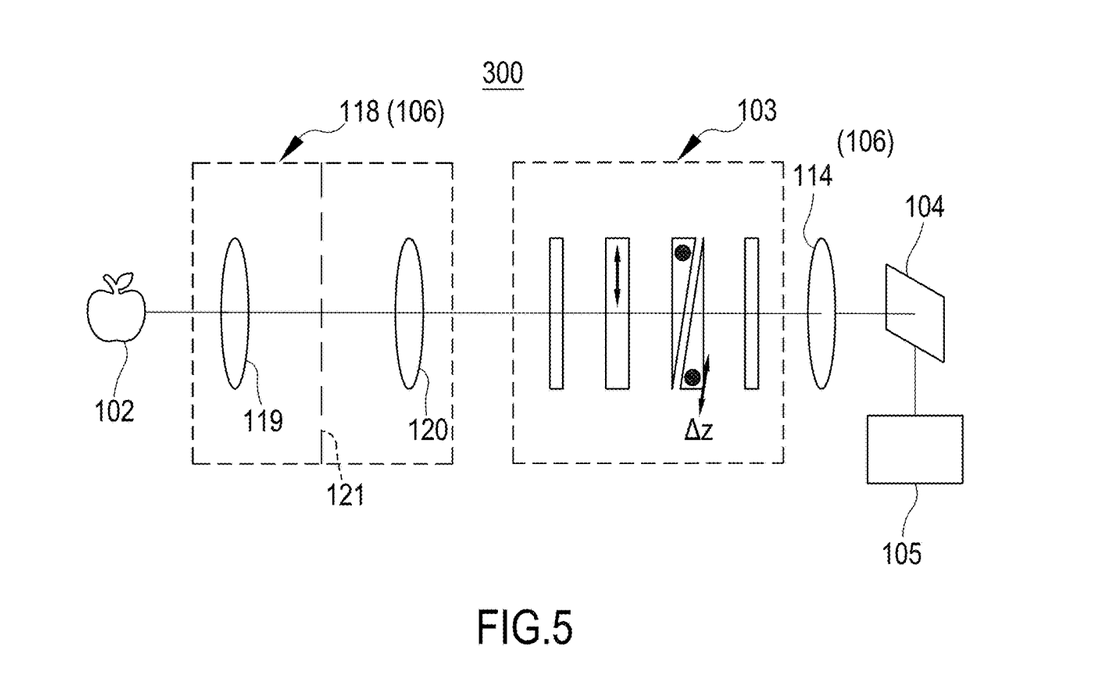
FIG. 5 shows an example of a third embodiment of the Fourier-transform hyperspectral imaging system, operating as a camera.

FIG. 5 refers to a third embodiment, indicated with the reference number 300, of the Fourier-transform hyperspectral imaging system 100. According to the third embodiment, the optical imaging system 106 further includes an optical system 118 comprising a first collimating lens 119 and a second collimating lens 120, placed at the input of the interferometer module 103. The optical system 118 allows better collimating the light beam travelling into the interferometer module 103 and achieve better visibility of the interference pattern.

Preferably, the optical system 118 also includes an iris 121 configured to adjust the numerical aperture of the optical system 118 itself. The third embodiment 300 may operate as hyperspectral camera as described for the previous embodiments. The first collimating lens 119 can be considered an example of the input 101.

Figure 6:
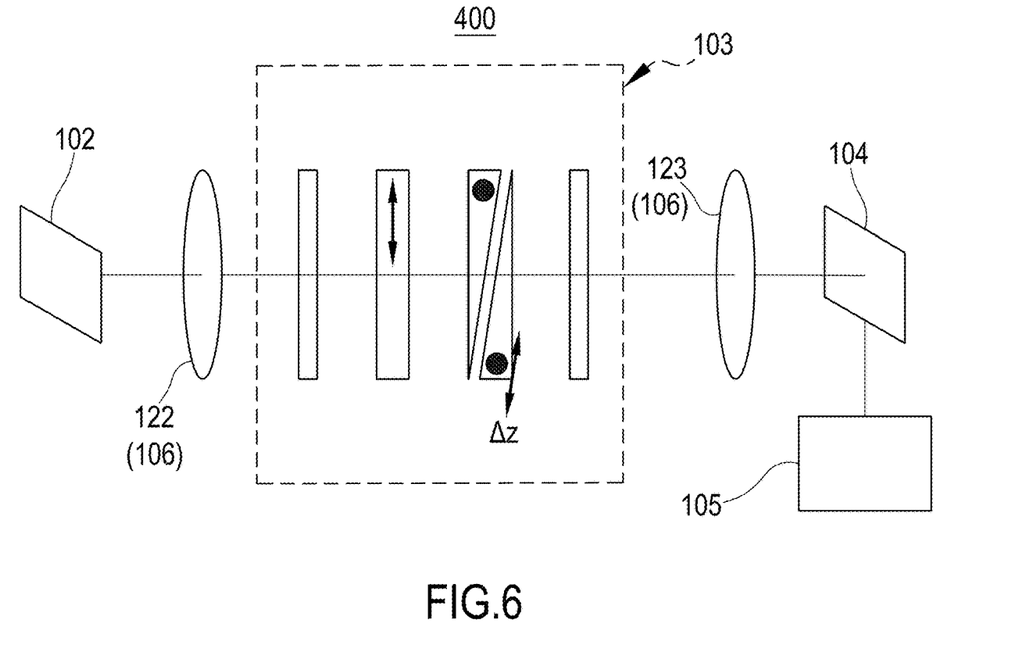
FIG. 6 shows an example of a fourth embodiment of the Fourier-transform hyperspectral imaging system operating as a microscope.

Reference is made to the fourth embodiment 400, shown in FIG. 6, which is a hyperspectral imaging system analogous to the one of FIG. 1 but configured to operate as hyperspectral microscope.

In addition to the components described with reference to FIG. 1, the fourth embodiment 400 comprises an imaging optical system 106 provided with a microscope objective 122 placed at the input of the interferometer module 103 and a tube lens 123 placed at the output of the interferometer module 103.

The microscope objective 122 provides the requested microscope magnification. The operation of the fourth embodiment is analog to the one described with reference to FIG. 1.

Figure 7:
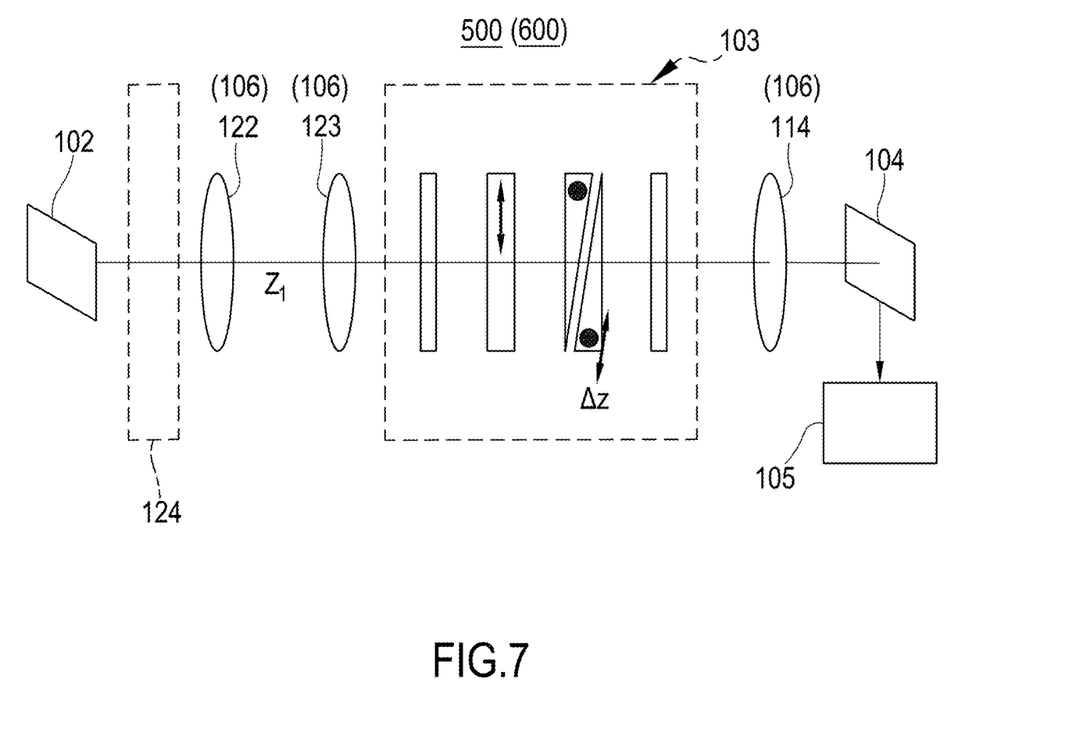
FIG. 7 shows an example of a fifth embodiment of the Fourier-transform hyperspectral imaging system operating as a microscope.

FIG. 7 refers to a fifth embodiment 500 which is analogous to the fourth embodiment 400. According to the fifth embodiment 500, the hyperspectral microscope is obtained by placing the microscope objective 122 and the tube lens 123 at the input of the interferometer module 103 and the camera objective or lens 114 at the input of the 2D detector 104.

Figure 8:
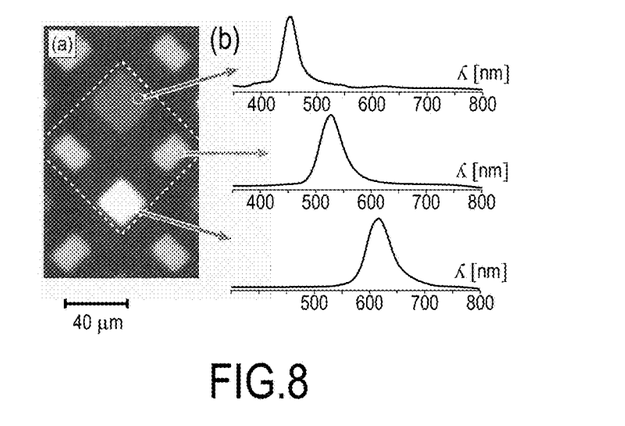
FIG. 8 exemplary shows a microscope image obtained using the fifth embodiment of FIG. 7.

FIG. 8 shows a microscope image obtained using the fifth embodiment of FIG. 7. Particularly, FIG. 8 shows an image of one pixel (in the dashed box) of a smartphone screen, made by elements emitting light of the primary colors RGB: FIG. 8a) shows a b/w raw image of the sample and FIG. 8b) shows emission spectra of three points of the image measured by the hyperspectral microscope.

According to a sixth embodiment, by adding a light shutter 124 to the structure of the fifth embodiment 500 a sharp tunable filter 600 can be obtained. According to this sixth embodiment, a proper choice of the positions $\Delta z$ allows implementing a sharp tunable filtering. The filter 600 can be controlled in terms of central wavelength and spectral width with a good degree of flexibility. This permits the acquisition of quasi monochromatic images, spectrally matched to the emission wavelength of any sample 102 that must be discriminated from an unspecific background. This permits to set up an easily reconfigurable microscope that can highlight specific fluorescent labelling largely used in molecular biology. One or more labelling agents amongst the most common biomarkers (e.g. Cyanine dyes, and genetically encoded markers, like GFP, DsRed, etc.) can be separated in the same microscope field through the acquisition of only few images. The advantage of this approach, with respect to the acquisition of the whole spectrum, is the dramatic reduction in the measurement and processing time, since the synthesis of each spectral filter requires the acquisition of only two images.

It is observed that the light shutter 124 can be placed in a position different from the one shown in FIG. 7: e.g. at the input of the 2D detector 104, or can be any device controlling the illumination of the object 102. The shutter 124 can be made by an optical device that switches on and an off its optical transmission or by an electronic circuit that interrupts the light illuminating the object 102.

Once a central wavelength $\bar{\lambda}$ of the synthetic filter has been selected, a set of Δz positions of the movable second optical wedge 110 is calculated in such a way to provide a delay $\tau_n$ between the replicas of the image equal to a multiple of $\bar{\lambda}/c$, corresponding to a phase delay multiple of 2n. This is achieved when the following condition is satisfied:

$$\{\Delta z_n\}_{Ph} \rightarrow \{\tau_n = n\bar{\lambda}/c\}, n=1 \ldots N \quad (2)$$

The positions of the movable second optical wedge 110 in the set $\{\Delta z_n\}_{Ph}$ imply constructive interference for the light at the wavelength $\bar{\lambda}$, ideally corresponding to 100% transmittance for the associated "signal". A sequence of exposures, controlled by the optical shutter 124, are performed for the positions of the wedges satisfying the above condition (2), which is called "Phase".

In the meantime, all the exposures are integrated by the 2D detector 104 into a single image. This implements a known method used in photography and scientific imaging, called "multiple exposure".

Yet, the image acquired in this way, even if it possesses the maximum amount of signal at wavelength $\bar{\lambda}$, is affected by the presence of light at all the wavelengths other from $\bar{\lambda}$. In fact, those wavelengths are attenuated, but not suppressed, giving a large "noise" superimposed to the signal. A second set of wedge positions, called $\{\Delta z_n\}_{Quad}$, can be set-up in order to provide destructive interference for $\bar{\lambda}$. This result can be achieved with the condition:

$$\{\Delta z_n\}_{Quad} \rightarrow \{\tau_n = (2n+1)\bar{\lambda}/2c\}, n=0 \ldots N-1 \quad (3)$$

Then, a second image is acquired for the $(\Delta z_n)_{Quad}$ set of delays, leading to the so called "Quadrature" image.

It is worth noting that the signal $(\bar{\lambda})$ is completely absent in the Quadrature image. On the other hand, the contribution of the noise (at all the wavelengths other than $\bar{\lambda}$) is comparable in the Phase and Quadrature images, if N is large enough (e.g. N=20).

Finally, a subtraction of the Quadrature image of expression (3) from the Phase image of expression (2) gives the required spectral selectivity, since the signal is extracted from the noise, which is virtually removed or, at least, strongly attenuated. The subtraction can be implemented by the analysis device 105, which also controls the light shutter 124, that is switched on and off at the positions of the second wedge 110 corresponding to the Phase and Quadrature sets, while the second wedge 110 is continuously moving.

The above described method is especially convenient for performing fluorescence studies of biological specimens. The wavelength $\bar{\lambda}$, in that case, can be chosen to be the peak emission wavelength of a specific marker.

The above described method allows taking the Phase and Quadrature images in a very short time, only limited by the speed of the wedges and by the time constant of the shutter 124, which can be in the range of microseconds.

It is noticed that according to the sixth embodiment 600, the analysis device 105 does not perform a digital computation of a Fourier-Transform of the digital images provided by the two-dimensional light detector 104. Indeed, the combination of the image sampling associated with the light interruption (e.g. the action of the shutter 124) and the sequence of exposures made by the two-dimensional light detector 104 (equivalent to a summation) correspond to a discrete Fourier-Transform.

Figure 9:
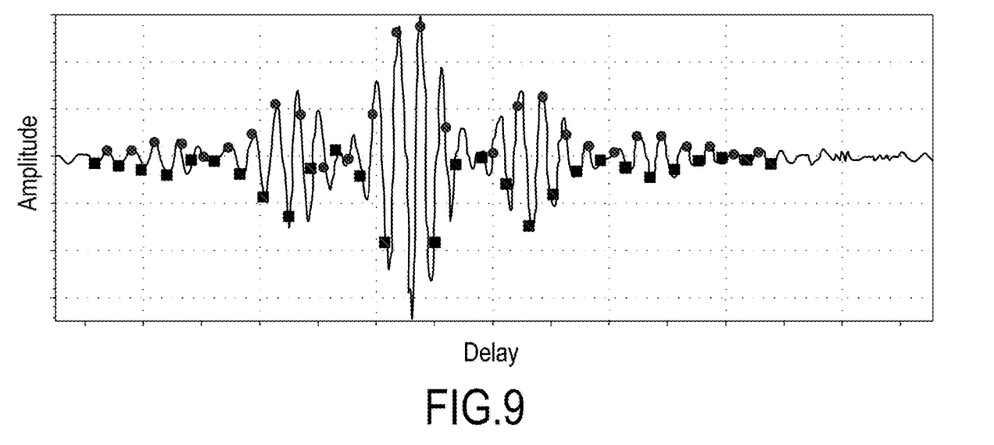
FIG. 9 shows an example of interferogram for a polychromatic beam obtainable by a tunable filter structured according to the scheme of FIG. 7.

FIG. 9 shows an example of interferogram for a polychromatic radiation $IN_R$. The exposures (which result in sampling the interferogram) corresponding to the Phase (dots) and Quadrature (squares) conditions are indicated by markers in the interferogram.

Figure 10:
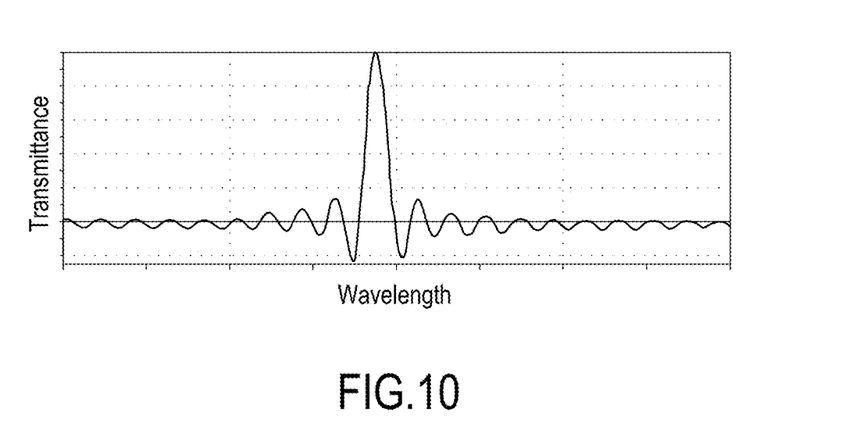
FIG. 10 exemplary shows a spectral profile of said tunable filter.

FIG. 10 shows the spectral profile of the corresponding synthetic filter, which strongly privileges the transmittance at the selected wavelength. It can be demonstrated that increasing N makes the filter sharper and reduces the side bands. During an image acquisition the spectrum of the acquired light is given by the product of the emission spectrum of the sample multiplied by the spectrum of the synthetic filter.

The Fourier-transform hyperspectral imaging system according to any one of the above-described embodiments can operate in the wavelength ranges dictated by the transparency of the optical elements and the sensitivity of the two-dimensional detector 104. The ranges are, for example (but not limited to) 180-3500 nm (using alfa-BBO α-$BaB_2O_4$ as a birefringent material), 500-5000 nm (using lithium niobate $LiNbO_3$ as a birefringent crystal), 400-20000 nm (using calomel $Hg_2Cl_2$ as a birefringent crystal.

The above described embodiment of the Fourier-transform hyperspectral imaging system can be employed in different fields, including pharmaceuticals, agriculture, food quality control, material identification, mapping of the works of art and remote sensing, where hyperspectral images are performed regularly in order to retrieve crucial information about the spectral properties of the sample as a function of the position.

It is observed that the hyperspectral images, especially in the infrared region, are helpful to access information below the surface layer and have been also used for many applications that include, in a non-exhaustive list:

i) the search for clues of oilfields through the detection of hydrocarbon micro-seepages;

ii) the analysis of forests and crop fields in agriculture;

iii) the extraction of preparatory drawings from below the painted layer and to detect forgeries in paintings;

iv) the forensic analysis of documents, fingerprint detection and for blood stain dating at crime scenes.

The above described Fourier-transform hyperspectral imaging system shows several advantages over the known hyperspectral imaging systems.

Particularly, the employed Fourier-transform approach provides for the following advantages:

all the wavelengths are measured simultaneously, thus increasing the number of photons reaching the 2D detector 104 and consequently decreasing measurement times; this leads to higher signal-to-noise ratio for the detection regimes in which sensitivity is limited by detector noise (i.e. the so called Felgett advantage);

higher optical throughput, due to the absence of entrance and exit slits typical of other optical schemes (the Jacquinot advantage);

the possibility of easily adjusting the frequency resolution by varying the scan range of the moving wedge directly by the user via software, without the need of modifying the hardware;

the spectral resolution can be increased without affecting the optical throughput;

the described hyperspectral imaging system can have sub-nanometer wavelength resolution, better than the current available technologies;

the described hyperspectral imaging system acquires continuous spectra for each pixel, and it is not limited to only discrete wavelengths like ones employing filters;

the described hyperspectral imaging system has a much larger working spectral bandwidth than the variable filter approach and it can cover from the ultraviolet to the infrared region;

the described hyperspectral imaging system is both accurate and reproducible thus a frequent calibration is not required, contrary to some of the other technologies (the Connes advantage);

Moreover, the described hyperspectral imaging system shows the following additional advantages:

the image acquisition is performed in parallel: this avoids raster scanning, thus allowing much faster acquisitions;

thanks to the compactness of the interferometer module 103, the hyperspectral imaging system is remarkably simple and compact, contributing to reduce the costs with respect to previous technologies;

since the hyperspectral imaging system is based on birefringent crystals, it is almost insensitive to temperature differences and to environmental conditions. Furthermore, employing a common-path geometry, it is inherently robust against mechanical vibrations, often detrimental in other Fourier-transform approaches in which the two replicas are separated in space. This is also advantageous with respect to scanning approaches based on liquid crystal technologies;

the particular arrangement of the birefringent plate 108 and the wedge pair 107 allows obtaining spatial coherence, which is a prerequisite to obtain high-contrast interference patterns, improving the signal-to-noise ratio.

With reference to the above mentioned prior art documents J. Craven-Jones et al. "Infrared hyperspectral imaging polarimeter using birefringent prisms" and A. R. Harvey et al. "Birefringent Fourier-transform imaging spectrometer" it is noticed that the hyperspectral imaging system herein described does not show the limited interferometric modulation due to chromatic dispersion and spatial separation of the replicas.

The Wollaston prism employed in the above indicated prior art documents divides the light into two orthogonally polarized replicas that after the prisms are angularly separated and then need to be merged again by another optics (i.e. a lens) before the imaging detector. The two light replicas interfere at the detector coming from different directions; therefore, also the wavefronts of the two beams are inclined accordingly and this causes a loss of the interferometric modulation at the detector that reduces the signal to background ratio.

Moreover, the Wollaston prisms separate angularly the different spectral components of the light and this further reduces the interferometric modulation at the detector, because the same colour of the two orthogonally polarized replicas impinges onto a slightly different position of the camera, thus reducing the interferometric signal.

These two undesired effects can be strongly attenuated in the present hyperspectral system, since the two wedges 109 and 110 can be placed close together and both the separation and spectral dispersion effects are negligible with respect to the case of two Wollaston prisms.

It is noticed that these two problems increase when the two Wollaston prisms are made bigger in order to increase the maximum interferometric delay and therefore the maximum spectral resolution.

APPENDIX

In the following paragraphs the properties of the interferometer module 103 will be discussed and additional and preferred indications will be provided in order to design the interferometer module 103, used in the Fourier-transform hyperspectral imaging systems 100-600.

It is noticed that the figure of merit which qualifies an interferometer is the visibility of the interferogram it generates as a function of the phase delay. The visibility v is defined as:

$$v = \frac{I_{max} - I_{min}}{I_{max} + I_{min}} \quad (4)$$

Where letter I represents light Intensity. The visibility v ranges from 0 (worst case, no fringes are detected) to 1 (best case, the modulation of the fringes is 100%).

An imaging system can be characterized by three aspects: (i) it collects light from a wide field of view, since light arises from an extended object or a scene; (ii) the light emerging from each point is a diverging field; (iii) light is collected by a bidimensional matrix detector, any pixel of which images one point of the scene.

We call P a generic point of an object or scene, and J the pixel of the detector capturing its image. When an interferometer is applied to the imaging system, it produces a sequence of images as a function of the phase delay.

Any pixel J records the interferogram, which holds information about the corresponding point P. Generally, we can define the following preferred criterion: in a preferred embodiment of the Fourier-transform hyperspectral imaging system, the visibility of the interferogram at any pixel J of the image is larger than a given threshold: $v > v_{min}$ Let's first consider which parameters influence the fringe visibility v at a generic pixel J. In the following we will consider monochromatic waves with angular frequency ω.

Phase-Shift in a Birefringent Interferometer—Premise

In order to estimate the fringe visibility in an imaging system, we will evaluate the behavior of the interferometer module 103 for a generic ray propagation direction.

FIG. 11(a) shows two birefringent plates, A and B, with crossed optical axes. Block B represents the wedge pair 107, whereas A is the bias plate (corresponding to the above described optical element 108); air spacing has been neglected for simplicity. This system can be applied to generate delayed replicas of fields propagating at any direction with an incident angle α. In the following, the phase delay $\psi_T$ of the interferometer module 103 will be defined as the phase delay imposed to the two replicas of a ray propagating at α=0 (i.e., propagating normally to the wedge surface).

Let's now consider a ray propagating at an angle α with respect to the normal direction. We get that the vertically and horizontally-polarized components accumulate a relative phase shift φ. Panel (b) plots φ as a function of α, when $\psi_T=0$ (i.e. both plates have the same thickness L). φ is evaluated for a wave at λ=600 nm in α-BBO blocks with L=2.4 mm.

Particularly, FIG. 11(a) shows optical paths of the vertically-polarized (V1) and horizontally-polarized (P1) replicas of an input ray in the birefringent system; dashed lines: extraordinary ray; solid line: ordinary ray.

Figure 11:
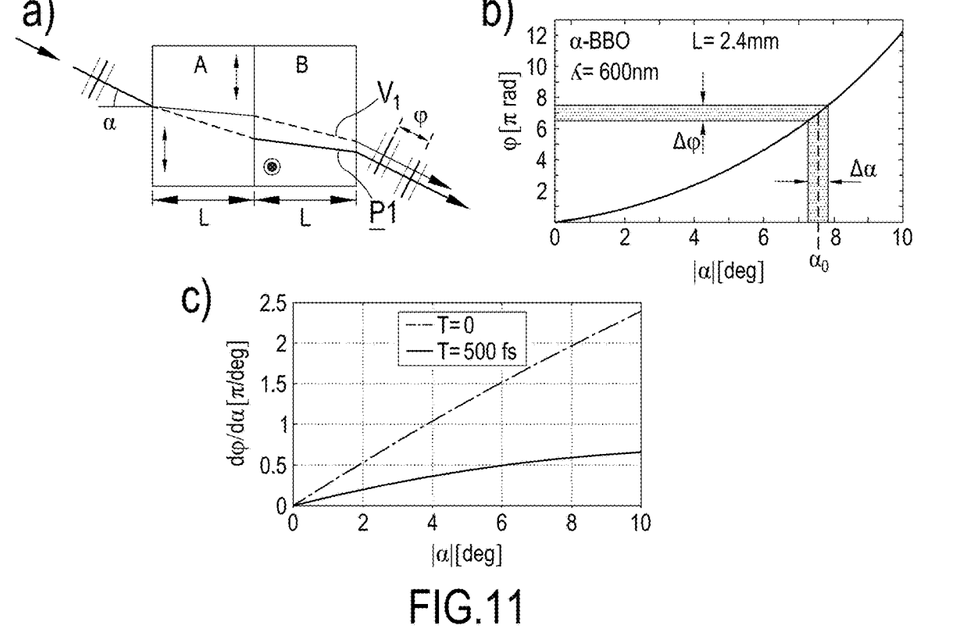
FIG. 11a shows two birefringent plates of said interferometer module.
FIG. 11b represents accumulated phase delay $\varphi$ in the plates of FIG. 11a, evaluated when $\psi_T=0$.
FIG. 11c represents first derivative of $\varphi$ for two values of the phase delay $\psi_T$.
Figure 12:
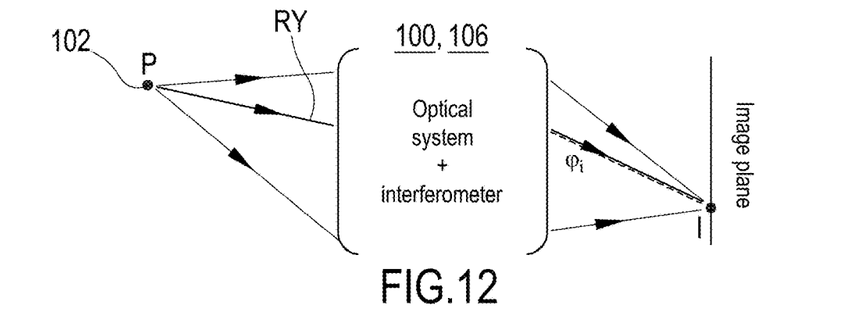
FIG. 12 shows a schematic representation of an imaging optical system employing said interferometer module.

FIG. 11(b) shows that the incidence angle α strongly affects φ. Let's now discuss how this effect may influence the visibility. In an imaging system, the light emerging from each point P of the scene can be represented as a bundle of rays traveling through the interferometer and the imaging optics, into the corresponding pixel J at the image plane (FIG. 12). Particularly, FIG. 11(b) represents the relative phase φ accumulated by the crossed-polarized replicas as a function of a when T=0.

FIG. 12 is a schematic representation of the optical imaging system 106 coupled with the interferometer module 103, with a ray bundle traveling from the object point P (102) to its image J. The line RY is the generic i-th ray. After the interferometer module 103, the ray is the overlap of two delayed wave replicas (solid and dashed lines), with relative phase-shift φi.

The interferometer module 103 placed in the imaging system of FIG. 12 generates, for each generic i-th ray, two phase-delayed ($\psi_T + \varphi_i$) replicas, which in the frame of reference of the vertically-polarized beam, can be written as:

$$E_i = \cos[\omega t] + \cos[\omega t - \psi_T - \varphi_i] \quad (5)$$

where unitary amplitude has been assumed for simplicity and where $\psi_T$ and $\varphi_i$ are the relative phase delays, as follows:
  $\psi_T$ is introduced by scanning the thickness of the plates; $\psi_T = 0$ when the two plates (A and B) have the same thickness;
  $\varphi_i$ depends on the propagation direction as shown in FIG. 11.
For a given phase delay $\psi_T$, the overlap at pixel J of all rays from P (102) results in:

$$E_J(T) = \Sigma_i E_i = \Sigma_i \{\cos[\omega t] + \cos[\omega t - \psi_T - \varphi_i]\} \quad (6)$$

By taking the summation, we get that the resulting interferogram intensity $\langle E_J(T)^2 \rangle$ depends on the distribution of phase shifts $\varphi_i$. To numerically evaluate the visibility, it is sufficient to scan $\psi_T$ in the neighborhood of $\psi_T = 0$ (following the book Born-Wolf, "Principles Of Optics", Cambridge University press (2005), page 298).

Figure 13:
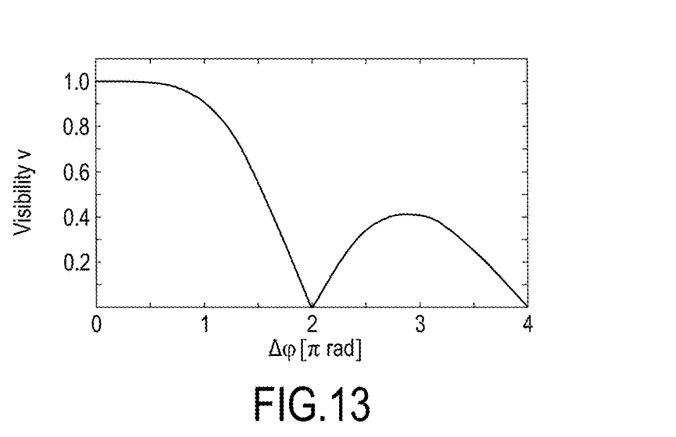
FIG. 13 shows the trend of the visibility as a function of the relative phase spread.

When the phase-shifts $\varphi_i$ of the ray bundles range from $\varphi_1$ to $\varphi_2$, it is possible to show that:
  the visibility v depends on the phase spread $\Delta\varphi = |\varphi_2 - \varphi_1|$ as shown in FIG. 13.
  the so-called zero path-difference, that is the zero-delay of the interferogram, is shifted at $\psi_0 = \langle\varphi\rangle$, where $\langle\varphi\rangle \approx (\varphi_2 + \varphi_1)/2$.

It is clarified that FIG. 13 shows the visibility of the interferogram of a set of CW wave replicas, as a function of the relative phase spread Δp.

It is noticed that if all rays have the same phase shift φ, (i.e. Δφ=0) the visibility is v=1.

To get v larger than a given threshold $V_{min}$, the phase range $\Delta\varphi$ should be smaller than $\Delta\varphi_{max}$. Particularly, in the case of an interferometric imaging system, the condition $v > v_{min}$ is, preferably, fulfilled for all the pixels in the image plane.

In our case, since φ depends on α, the phase spread Δφ depends on Δα as $\Delta\varphi \approx (d\varphi/d\alpha) \ast \Delta\alpha$, where dφ/dα is the first derivative of φ. FIG. 11(c) plots the first derivative of φ for two values of the phase delay $\psi_T$, and shows that the most critical configuration, corresponding to the largest value, is obtained at $\psi_T = 0$. For this reason, we will only focus on the case $\psi_T = 0$.

Figure 14:
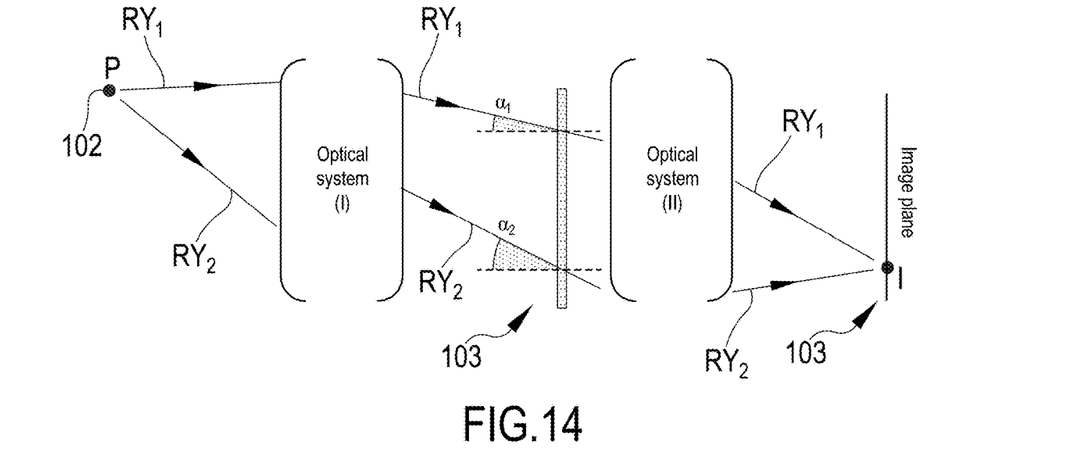
FIG. 14 shows a schematic representation of said Fourier-transform hyperspectral imaging system.

Examples of Design Criteria of the Fourier-Transform Hyperspectral Imaging System of the Present Invention FIG. 14 shows a scheme of the Fourier-transform hyperspectral imaging system in accordance with the above described embodiments and including the interferometer module 103 in its optical chain. Optical system (I) includes all the optics between point P (object 102) and the interferometer module 103 (such as a lens or an objective of the imaging system 106). Optical system (II) groups all the optics between the interferometer and the 2D detector 104 (such as a lens or an objective of the imaging system 106).

Lines RY1 and lines RY2 are the peripheral rays of the bundle traveling from P to J. They impinge on the birefringent interferometer module 103 at angles $\alpha_1$ and $\alpha_2$, respectively, hence all the rays of the bundle have angles ranging from $\alpha_1$ to $\alpha_2$. The average angle is $\alpha_0 = (\alpha_1 + \alpha_2)/2$, and $\Delta\alpha = |\alpha_1 - \alpha_2|$.

From these considerations, we can state the preferred criterion to build a hyperspectral imaging system. This criterion defines a preferred example of the design procedure.

In preferred imaging systems, characterized by high visibility v at any pixel, the bundle of rays traveling from P into pixel J shows a phase range $\Delta\varphi = |\varphi_2 - \varphi_1| < \Delta\varphi_{max}$.

Preferably, the maximum phase difference $\Delta\varphi_{max}$ is comprised in the range 1.0 π rad and 1.8 π rad. More preferably, $\Delta\varphi_{max}$ is no greater than 1.0 π rad. Particularly, if $\Delta\varphi_{max}$ is no greater than 1.0 π rad a visibility v>0.9 can be obtained; if $\Delta\varphi_{max}$ is no greater than 1.5 π rad a visibility v>0.55 can be obtained; if $\Delta\varphi_{max}$ is no greater than 1.8 π rad a visibility v>0.21 can be obtained.

According to FIG. 11(b), this is obtained by placing the birefringent interferometer module 103 at specific planes, where $(d\varphi/d\alpha) \ast \Delta\alpha < \Delta\varphi_{max}$ (for example, $\Delta\varphi_{max} = \pi$ rad), that is the product $(d\varphi/d\alpha) \ast \Delta\alpha$ should be smaller than $\Delta\varphi_{max}$. In the following, we will apply this general preferred rule to the design of three imaging systems.

Hyperspectral Camera for Remote Sensing

Figure 15:
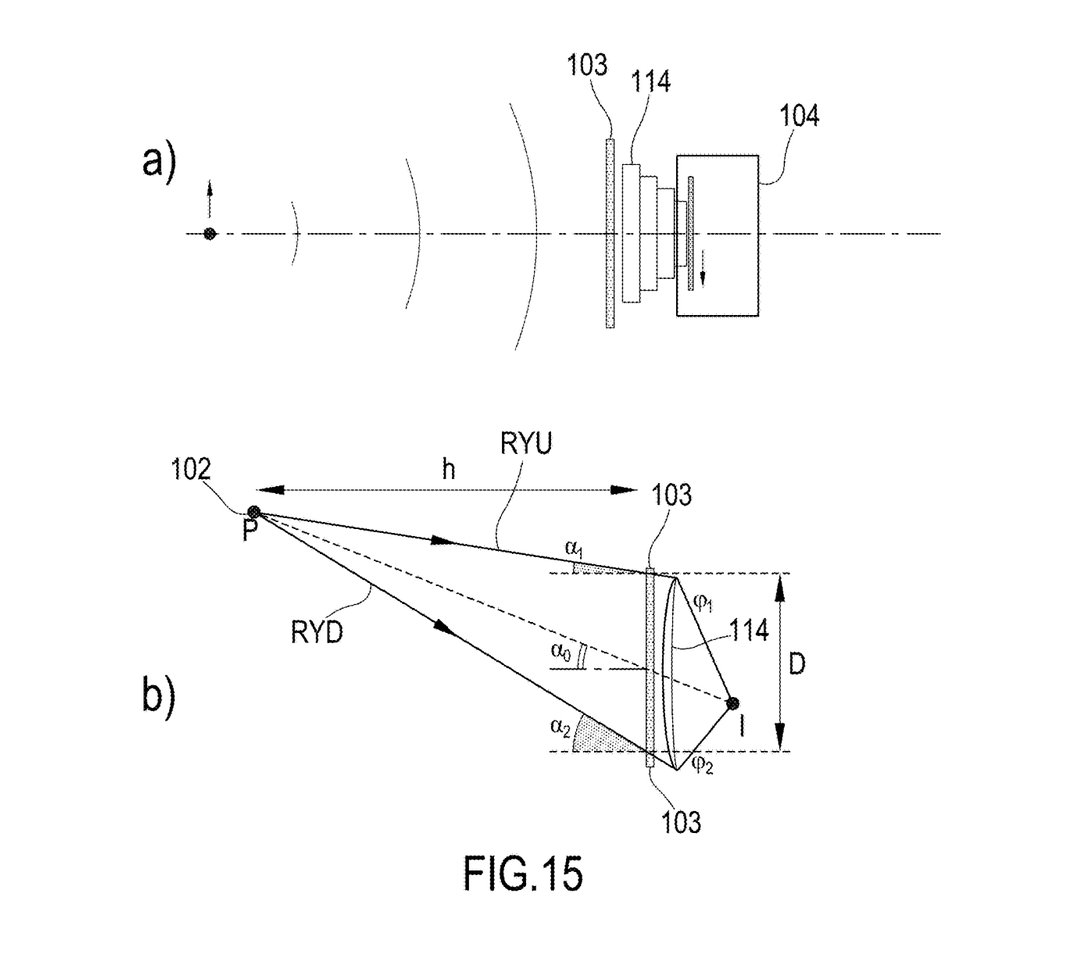
FIG. 15 shows schematically a hyperspectral camera in accordance with the embodiments of FIGS. 1, 4 and 5.

This paragraph refers to the embodiments of FIGS. 1, 4 and 5 (embodiments 100, 200, 300). The hyperspectral camera is illustrated in FIG. 15 and is made of:
  the birefringent interferometer module 103;
  the camera lens 114 with diameter D and focal length f;
  the two-dimensional detector 104.
With this configuration:
  the angles of incidence of the peripheral rays (RYU and RYD4) are $\alpha_1$ and $\alpha_2$ respectively. The excursion $\Delta\alpha = |\alpha_1 - \alpha_2|$ depends on the diameter D and on the distance h (h>>f) of the object 102:

$\Delta\alpha \approx \text{arc } tg(D/h)$ the largest value of $\alpha_0$ depends on the camera field of view, which depends on the size of the two-dimensional detector 104 and the lens focal length f.

To design a camera with large visibility for all the pixels J of the detector, it is convenient to focus on the most unfavorable condition, i.e. those points P whose rays have the largest excursion Δφ. As evidenced in FIG. 15(b), they are at the edge of the field of view, where the curve of FIG. 11(b), which represents the phase delay φ as a function of α, has the largest slope dφ/dα.

Example

Camera lens diameter: D=5 mm
Object distance: h=1 m

2D Detector: 1/1.8"; Camera lens f=25 mm;
field of view: 15.4°; largest value of $\alpha_0$=7.7
which leads to:

$$\Delta\alpha=0.28 \rightarrow \Delta\varphi(\alpha_0)=0.537\pi \text{ rad} \quad (7)$$

From FIG. 12 we deduce that in this case the visibility v for the pixels at the edge of the field of view is:

$$v > 0.9$$

The contrast of all other pixels will be higher than this value.

These figures demonstrate that it is possible to build a high-v hyperspectral camera by placing the interferometer module 103 in front of the camera objective of an imaging system.

Hyperspectral Microscope with Uniform Zero Path-Difference

Figure 16:
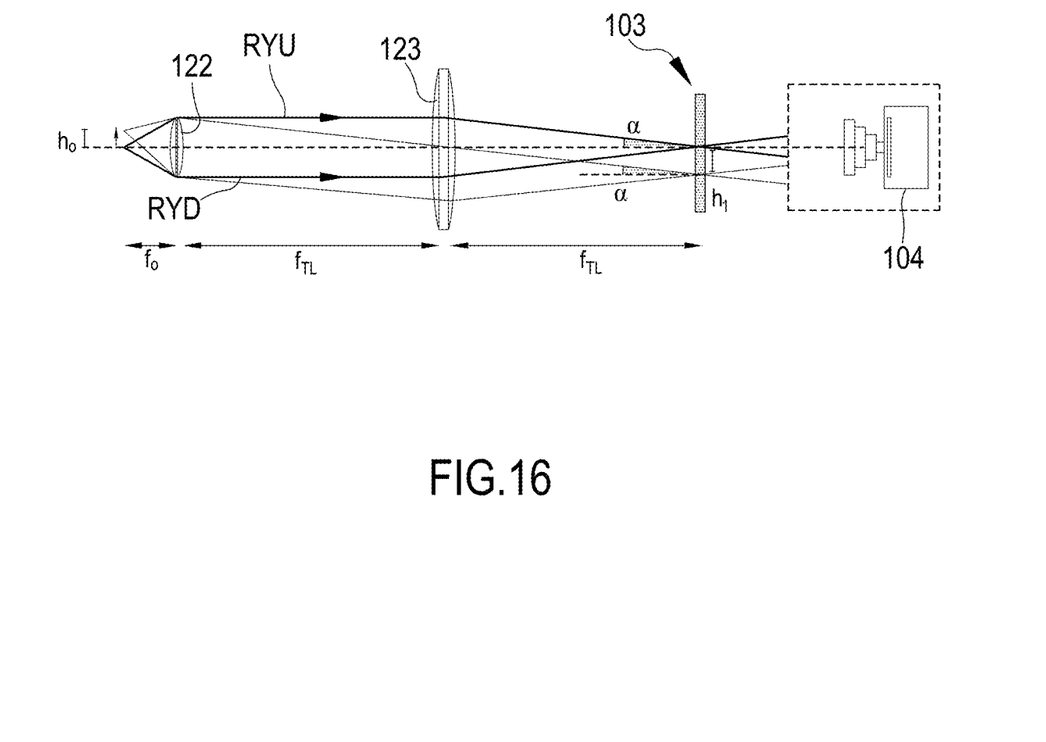
FIG. 16 shows schematically a hyperspectral microscope in accordance with the embodiment of FIG. 7.

This paragraph refers to the embodiment 500 of FIG. 7. The microscope is illustrated in FIG. 16, and is made of:
an infinite-corrected objective 122 with magnification ratio M and numerical aperture N.A.
Even if the focal length is not the primary parameter to characterize microscope objectives, we can assume a focal length $f_0$;
a tube lens 123 with focal length $f_{TL}$ such as $M=f_{TL}/f_0$;
the birefringent interferometer module 103 located in the focal plane of the tube lens 123;
a secondary imaging system (the objective or lens 114) attached to the 2D detector 104 that forms the image of the plane of the birefringent interferometer onto the 2D detector 104.

It is noticed that the distance of the tube lens 123 from the objective 122 and the distance of the interferometer module 103 from the tube lens 123 are equal to each other and to the focal length $f_{TL}$.

The numerical aperture N.A. of a microscope objective is defined as the sine of the angle θ subtended by the peripheral (i.e. marginal) ray.

With this configuration:
the angles of incidence of the peripheral rays (RYU and RYD) is −α and +α respectively; a depends only on the numerical aperture N.A. of the objective 122 and on its lateral magnification M, but not on the position of P. In fact, for whatsoever point in the object plane within the field of view of the microscope, for the Abbe sine condition, which holds for aplanatic optical systems, one gets:

$$n_o h_o \sin(\theta) = n_i h_i \sin(\alpha),$$

where $n_o$ and $n_i$ are the refractive indices in the object and image spaces, respectively, while $h_o$ and $h_i$ are the size of the object and of its image, made by the tube lens. Finally, sin (θ) is the numerical aperture N.A. of the objective 122. Assuming an equal refractive index on both sides of the optical system, since $M=h_i/h_o$, it is very simple to get an expression for α:

$$\alpha=\arcsin(N.A./M);$$

α is typically very small, so that we can assume sin (α)≅α. Hence, we finally get:

$$\alpha=N.A./M;$$

the average of the angle of incidence is $\alpha_0$=0, for any point P. As clear from FIG. 11b, at the angle of incidence $\alpha_0$=0 the first derivative dφ/dα is 0.

As a consequence, for any point P, φ ranges from −φ(α) to +φ(α). This means that:

i) the zero path difference $\psi_0=\langle\varphi\rangle$ is equal to zero across all the pixels of the image;
ii) $\Delta\varphi=\varphi(\alpha)$.

Example

A microscope with these features is considered:
M=10
N.A.=0.3
$f_0$=20 mm
$f_{TL}$=200 mm
In this case, $$\Delta\alpha=\alpha=1.72° \rightarrow \Delta\varphi(\alpha)=0.38\pi \text{ rad}$$

From FIG. 12 we deduce that the visibility for all pixels is:

$$v \cong 1$$

These figures demonstrate that it is possible to build a high-v hyperspectral microscope by placing the birefringent interferometer 103 in the focal plane of the tube lens 123.

In addition, since with this configuration the zero path difference $\psi_0=\langle\langle\varphi\rangle\rangle$ is 0 across all the pixels of the image, it is particularly suited for the application of filtering procedure as described with reference to the sixth embodiment 600.

Hyperspectral Microscope with Maximum Visibility

Figure 17:
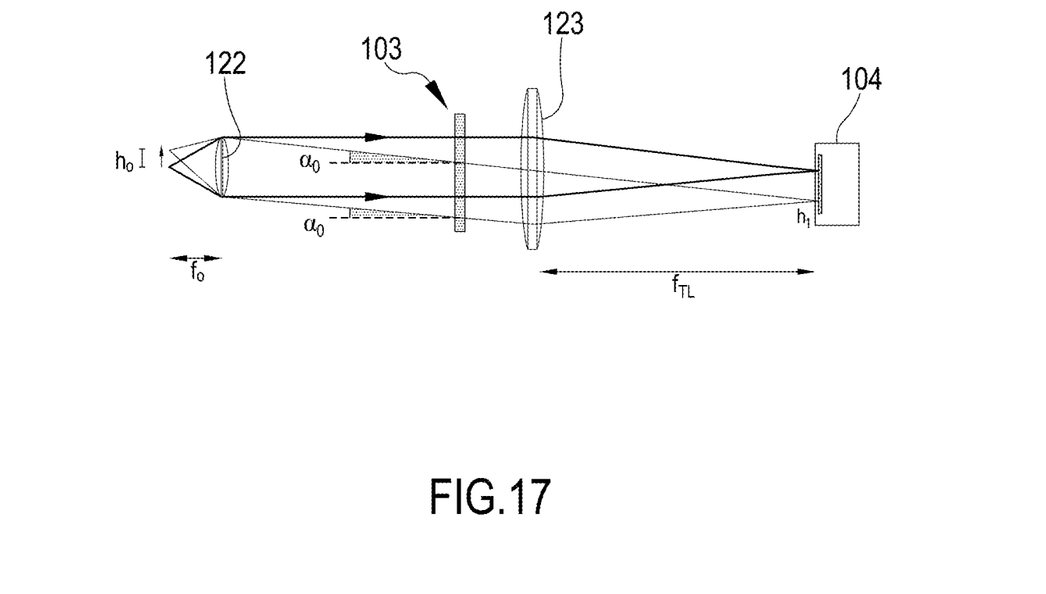
FIG. 17 shows schematically a hyperspectral microscope in accordance with the embodiment of FIG. 6.

This paragraph refers to the embodiment 400 of FIG. 6. The microscope is illustrated in FIG. 17 and comprises:
an infinite-corrected objective 122 with focal length $f_0$;
the birefringent interferometer module 103, located after the microscope objective 122;
the tube lens 123;
the detection optics 104.

With this configuration:
all the rays from point P impinge on the birefringent interferometer at the same angle $\alpha_0$; hence in each point of the image Δα≅0, which leads to Δφ≅0. This corresponds to v=1 in all the points of the image.
$\alpha_0$, whose maximum depends on the size of the object 102 and the focal length $f_0$, is different for each point of the image.

$$\alpha_0=h_0/f_0,$$

where $h_0$ is the height of the object point P.
As a consequence, for any point P, φ=φ($\alpha_0$), hence the zero path difference $\psi_0=\langle\varphi\rangle$ is different for each pixel of the image.

Example

A microscope with these features is considered:
$f_0$=20 mm
$h_{0Max}$=1 mm
In this case, $\alpha_0$ ranges from 0 to 2.86° across the image; conversely, Δφ≅0 for each pixel, which corresponds to v=1.

These figures demonstrate that it is possible to build a hyperspectral microscope with high-v by placing the birefringent interferometer module 103 after the microscope objective 122.

Tunable Filter 600

The fact that in configuration of FIG. 16 the zero path difference $\psi_0=\langle\varphi\rangle$ is 0 across all the pixels of the image, enables the application of the sharp tunable filter procedure, to obtain a band-passed image at frequency f (f=c/λ).

As already described, the protocol requires only two maps, named Phase and Quadrature. Each map is the superposition of images acquired at specific delays. The Phase map is obtained from images acquired at delays which are even multiples of T/2 (or equivalently, integer multiples of T, where T=1/f). On the contrary, the Quadrature map is obtained from images at delays which are odd multiples of T/2. By subtracting the Quadrature from the Phase map, one obtains information at f.

This protocol shows a variety of advantages: it produces only two maps instead of the numerous (≈100) images required by the hyperspectral detection; calculations show that each Phase or Quadrature map is typically the superposition of only 20 images; image superposition can be optically obtained by the so-called multiple exposure mechanism, which allows one to exploit the full camera dynamic range either by lowering the illumination dose, or by reducing the acquisition time of each exposure to few milliseconds.

The invention claimed is:

1. A Fourier-transform hyperspectral imaging system comprising:
    an optical imaging system configured to produce an image of an object and having an optical axis and input for an input radiation coming from points of the object;
    an adjustable birefringent common-path interferometer module comprising a movable birefringent element and configured to produce interfering replicas of said input radiation which are delayed from each other by a phase delay adjustable by the moving birefringent element; the interferometer module being configured to produce collinear replicas for entering optical rays parallel to said optical axis;
    a two-dimensional light detector reconfigured to receive the replicas and provide digital images of the object depending on said adjustable phase delay;
    an analysis device configured to perform a Fourier Transform of the digital images to obtain a hyperspectral representation of the object,
    wherein:
    a) said hyperspectral imaging system is configured so as to show in operation:
        a first peripheral ray of said input radiation having a first delayed phase $\varphi_1$ associated with the adjustable birefringent common-path interferometer module;
        a second peripheral ray of said input radiation having a second delayed phase $\varphi_2$ associated with the adjustable birefringent common-path interferometer module;
        an absolute difference $\Delta\varphi$ of the first delayed phase $\varphi_1$ and the second delayed phase $\varphi_2$ smaller than a maximum value $\Delta\varphi$max comprised between 1.0 π rad and 1.8 π rad;
    b) the adjustable birefringent common-path interferometer module comprises:
        an adjustable wedge pair, including an optical wedge and a movable optical wedge, configured to provide the phase delay between radiation components having reciprocally orthogonal polarizations; the phase delay is dependent on a variable position of the movable optical wedge;
        an actuator module causing movement of the movable optical wedge.

2. The hyperspectral imaging system of claim 1, wherein the hyperspectral imaging system is configured so as to minimize the following quantities:
    an absolute angular difference $\Delta\alpha$ between a first incident angle $\alpha_1$ of said first peripheral ray and a second incident angle $\alpha_2$ of said second peripheral ray;
    a first derivative $d\varphi/d\alpha$ of a radiation delayed phase function $\varphi$, associated with the adjustable birefringent common-path interferometer module, with respect to a variable α representing radiation incidence angle.

3. The hyperspectral imaging system of claim 1, wherein said interferometer module further comprises:
    an input polarizer configured to provide an output radiation of linear polarization;
    a birefringent optical element coupled with the adjustable wedge pair and configured to introduce a fixed phase delay between radiations of orthogonal polarizations;
    a polarizer device configured to project the phase delayed radiation components to a common polarization state, allowing them to interfere.

4. The hyperspectral imaging system of claim 1, wherein the optical imaging system includes an optical element selected to make the hyperspectral imaging system to operate as a hyperspectral camera.

5. The hyperspectral imaging system of claim 1, further comprising:
    a beam splitter optically coupled to the interferometer module to produce a first radiation portion propagating along a first propagation direction and a second radiation portion propagating along a second propagation direction;
    a further optical imaging system having a further optical axis aligned along said second propagation direction to receive the second radiation portion;
    a further two-dimensional light detector having spectral sensitivity different from the spectral sensitivity of said two-dimensional light detector and configured to receive the second radiation portion from the further optical imaging system to produce further digital images of said object; the further two-dimensional light detector being connected to the analysis device to obtain a further hyperspectral representation of the object spectrally broader than said hyperspectral representation of the object.

6. The hyperspectral imaging system of claim 1, wherein the optical imaging system includes at least a collimating lens placed at said input.

7. The hyperspectral imaging system of claim 1, wherein the optical imaging system includes a microscope objective and a tube lens configured so as the hyperspectral imaging system operates as a hyperspectral microscope.

8. The hyperspectral imaging system of claim 7, wherein the microscope objective and the tube lens are arranged at an input of the interferometer module; the optical imaging system further comprising a camera optical element arranged at an input of the two-dimensional light detector.

9. The hyperspectral imaging system of claim 1, configured to implement a tunable filter and wherein said analysis device includes an optical shutter arranged to interrupt radiation propagation so enabling/disabling production of the digital images by the two-dimensional detector; wherein the analysis device is further configured to:
    obtain a Phase Image from the two-dimensional detector corresponding to constructive interference of the digital images associated with a first plurality of values of the phase delay depending on a filtering selected wavelength;
    obtain a Quadrature Image from the two-dimensional detector corresponding to destructive interference of the digital images associated with a second plurality of values of the phase delay depending on the filtering selected wavelength;

perform a difference between the Phase Image and the Quadrature Image to obtain a resulting image.

10. The hyperspectral imaging system of claim 1, configured to operate in one of the wavelength ranges selected from: 180-3500 nm, 500-5000 nm, 400-20000 nm.

11. The hyperspectral imaging system of claim 1, wherein the adjustable wedge pair is made of one of the birefringent materials selected from: $\alpha$-$BaB_2O_4$, $LiNbO_3$, $Hg_2Cl_2$.

12. The hyperspectral imaging system of claim 1, configured to operate in one of the following technical fields: pharmaceuticals, agriculture, food quality control, material identification, mapping of the works of art and remote sensing.

* * * * *